E. J. AND R. E. COTTER.
STEPPING TOOL.
APPLICATION FILED DEC. 20, 1919.
1,406,156.
Patented Feb. 7, 1922.
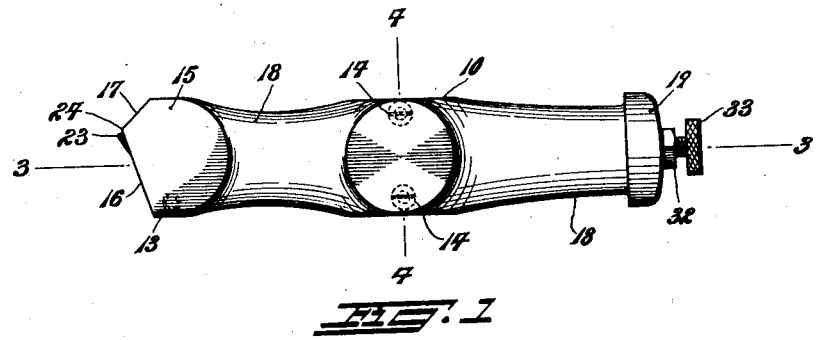
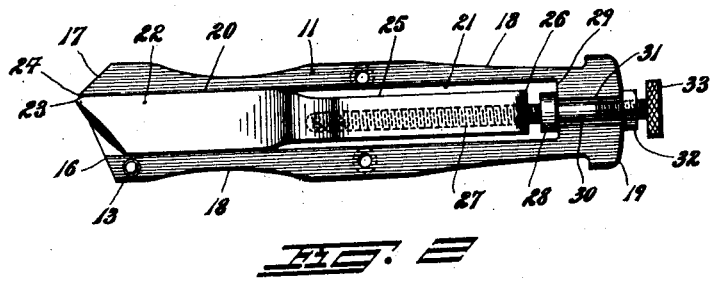
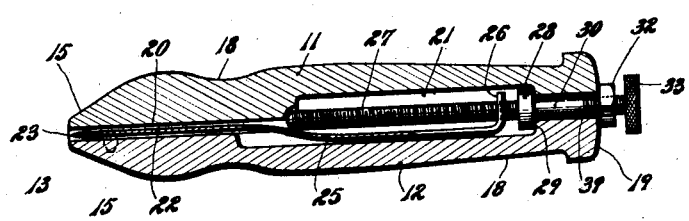
WITNESS:
Alfred J. Bratton
INVENTORS.
Edward J. Cotter & Roy E. Cotter
BY
Victor J. Evans ATTORNEY.

UNITED STATES PATENT OFFICE.

EDWARD J. COTTER AND ROY E. COTTER, OF PHILADELPHIA, PENNSYLVANIA.

STEPPING TOOL.

1,406,156.   Specification of Letters Patent.   Patented Feb. 7, 1922.

Application filed December 20, 1919. Serial No. 346,206.

*To all whom it may concern:*

Be it known that we, EDWARD J. COTTER and ROY E. COTTER, citizens of the United States, residing at Philadelphia, in the county of Philadelphia and State of Pennsylvania, have invented new and useful Improvements in Stepping Tools, of which the following is a specification.

This invention relates to tools or implements for stepping materials, that is to say for cutting one or more plies or folds of material whereby said ply or fold may be removed from the body without entirely cutting through the material.

The main object of this invention is to provide an improved form of tool for stepping a tire casing when repairing blow outs, punctures and the like.

Another object of the invention is to provide a tool of the nature referred to which is fitted with an adjustable blade so that the depth of the incision can be accurately gauged.

A still further object is to furnish a stepping tool by the use of which the accidental cutting of the material beyond the desired ply or fold is rendered impossible.

With the foregoing and other objects in view, our invention consists essentially in the novel features of construction, combination and arrangement of parts hereinafter fully described and more particularly pointed out by the appended claims.

In the further disclosure of the invention reference is to be had to the accompanying sheet of explanatory drawings constituting a part of this specification, and in which like characters of reference designate the same or similar parts in all the views.

Figure 1— is a longitudinal side elevation of our improved stepping tool.

Figure 2— is a similar view with one part of the casing removed to more clearly depict the underlying structure.

Figure 3— is a longitudinal section taken approximately on the line 3—3 in Figure 1; and, Figure 4— is a transverse section taken on the line 4—4 in Figure 1, and looking towards the left hand thereof.

Referring to the drawings the numeral 10, designate the tool in its entirety and it comprises opposed longitudinal members 11, 12, which are conveniently doweled at 13, and rigidly secured together by screws 14. These opposed members 11, 12, are preferably shaped as shown, that is to say they are chamfered down at 15, and finished off with an inclined part or narrow working end 16, and an obliquely disposed return edge or end 17, so that when the tool 10 is moved over the surface of the material from which it is desired to remove one or more plies or folds the cutting thereof can only be effected when said tool is drawn along with the inclined part 16, in direct contact therewith. Furthermore the opposed members 11, 12, are reduced and turned at 18, so that a firm hold can be maintained on the tool when in use and they are enlarged or headed at 18. Longitudinally of the part 11, I form a rectangular groove 20, as well as a cut away part 21, in the former of which snugly fits a blade 22, suitably ground at 23, to constitute the cutting point and it is to be noted that said point 23, is guided outwardly in line with the angular or forward point 24, of the inclined part 16.

The blade 22, is provided with an extension or shank 25 and a heel portion 26 at right angles thereto, said heel portion being threaded for the passage of a screw 27 which seats in the cut out portion 21, and a collar or shoulder 28 thereon abuts the part 29 of the member 11. This screw 27, is extended beyond the shoulder 28 at 30 to lie in a groove 31, and it is threaded to receive a lock nut 32, whilst a gnarled head 33 is secured to the outer end thereof whereby said screw 27 can be manipulated to project the cutting end 23 of the blade 22 forwardly the requisite amount to cut one or more plies or folds of the material to be repaired or operated upon. Obviously a reverse turning of the head 33 will effect the retraction of the cutting point 23 into the tool 10.

From the foregoing it will be readily seen that by our invention we provide an exceedingly efficient and effective tool for the purposes specified whilst at the same time the blade 22 can be easily removed for resetting or grinding by simply first removing the screws 14 and separating the parts 11, 12, whereupon said blade 22, and its associated screw 27 can be lifted out of the part 12. Still further it is to be particularly noted that the housing of the blade 22 in the groove 20 as set forth ensures its remaining rigid at all times, whereas by providing a finely threaded screw 27 very thin cuts can be rendered possible. Finally by shaping the end of the tool as described at 16, 17 any liability or tendency to cutting on the return stroke is entirely obviated, and whilst we have described a preferred construction of our invention it is to be clearly understood we do not limit ourselves to the precise details as regards shape and arrangement shown and particularly described, other forms and combinations being possible without departing from the spirit and scope of the appended claim.

Having described our invention what we claim as new and desire to secure by Letters Patent is:—

In a tool for cutting one or more plies or folds from a sheet of material, comprising a hollow handle having an obtuse end and a restricted passage entering from the said end of the bore proper of the handle, a blade slidable through the restricted passage and having its cutting edge arranged at an obtuse angle, said blade having its inner end offset and extended to provide a shank that is received in the bore proper of the handle and the end of the said shank being arranged at an angle and provided with a threaded opening, a bolt member passing through the end of the handle opposite that provided with the restricted passage and received through the threaded opening in the angle end of the shank, a knurled operating element for the bolt arranged on the outer end thereof, means for holding the bolt against longitudinal movement in the bore of the handle, and means for locking the bolt on the handle to prevent the turning thereof when the same has been actuated to project or retract the knife with respect to the handle.

In testimony whereof we affix our signatures.

EDWARD J. COTTER.
ROY E. COTTER.